United States Patent [19]

Shiel et al.

[11] Patent Number: 5,322,641
[45] Date of Patent: Jun. 21, 1994

[54] MAGNETIC MATERIALS AND PRODUCTS MADE THEREFROM

[75] Inventors: Leslie E. Shiel, Thame; Alan Dyer, Manchester; Kenneth A. Evans, Bucks; Angus I. Kirkland, Essex; Peter P. Edwards, Cambridge, all of United Kingdom

[73] Assignee: Alcan International Limited, Montreal, Canada

[21] Appl. No.: 781,128

[22] PCT Filed: May 11, 1990

[86] PCT No.: PCT/GB90/00730

§ 371 Date: Jan. 6, 1992

§ 102(e) Date: Jan. 6, 1992

[87] PCT Pub. No.: WO90/13605

PCT Pub. Date: Nov. 15, 1990

[30] Foreign Application Priority Data

May 12, 1989 [GB] United Kingdom ............... 8910978

[51] Int. Cl.⁵ .............................................. H01B 1/02
[52] U.S. Cl. ..................................... 252/514; 427/130
[58] Field of Search ................ 106/467, 468; 428/402; 501/145, 12; 252/512–514; 502/406; 427/130

[56] References Cited

U.S. PATENT DOCUMENTS

4,201,831  5/1980  Slusarczuk et al. ................. 428/403
4,874,433  10/1989  Kiss et al. ............................ 106/450

FOREIGN PATENT DOCUMENTS

0162979  12/1985  European Pat. Off.
1194940  4/1989  Japan.

OTHER PUBLICATIONS

Dul'nev, G. N. et al, "Method for calculating the thermal conductivity of porous granular materials with a metallic fillet in diferent media.," *Thermodynamics*, vol. 105, p. 447, (1986).

Nakao, Yukimichi et al, "Manufacture of metal–plated inorganic particles.," *Chemical Abstracts*, vol. 107, p. 146, (Sep. 12, 1987).

Okaniwa, Hiroshi et al, "Electrically conductive plastic composites.," *Chemical Abstracts*, vol. 80, p. 40, (Dec. 20, 1973).

*Primary Examiner*—Karl Group
*Assistant Examiner*—Alan Wright
*Attorney, Agent, or Firm*—Browdy and Neimark

[57] ABSTRACT

This invention relates to inorganic materials which incorporate metallic material and which have desirable magnetic properties, to methods of making such filled materials, and to applications of the filled material, including their use as fillers in plastics and in ceramics. An inorganic material is provided having a microporous structure (as hereinbefore defined) in which at least some of the micropores thereof are at least partially filled by at least one metal, metal alloy or metal compound or mixture thereof forming a structure within the micropores and which are present in an amount sufficient to modify the magnetic and optionally the electrically conductive properties of the unfilled material. Preferably the structure formed within the micropores is a dimensional structure (as hereinbefore defined) which is influenced by the structure of the microporous material. A preferred material is a zeolite loaded with at least 1% by weight of cobalt. Plastics filled with this inorganic material find a very wide range of applications, such as in magnetic latches for refrigerator doors, clamps, bearing sleeves and energy conversion devices, magnetic rotors, magnetic memory devices such as tapes and discs, magnetic indicators and beam-focussing devices for television receivers.

33 Claims, No Drawings

MAGNETIC MATERIALS AND PRODUCTS MADE THEREFROM

This invention relates to inorganic materials which incorporate metallic material and which have desirable magnetic properties, to methods of making such filled materials, and to applications of the filled material, including their use as fillers in plastics and in ceramics.

Although principally concerned with the magnetic properties of materials, the present invention also envisages the production of desirable electrical properties in addition to the production of desirable magnetic properties. It will be appreciated by those skilled in the art that modification of a material's magnetic properties means that its electronic characteristics will also be modified, and vice versa.

Considering firstly plastics materials:

Plastics material formed of organic polymers have an enormous number of applications and commonly contain inorganic mineral fillers to modify their mechanical properties. Most plastics materials are excellent electrical insulators and are non-magnetic.

In some situations it is desirable to modify the magnetic or electrical properties of the plastics material. For example it may be desired to reduce the electrical resistance of a plastics article in order to render it anti-static, that is to allow accumulated static electric charge on its surface to be discharged through the article. It may also be desired to reduce the electric resistance sufficiently to enable the plastics material to act as a shield for electromagnetic radiation. The latter feature is becoming more and more important given the proliferation of electrical equipment in homes, offices and factories, which has led to a large increase in stray radiation of a wide range of frequencies which can disturb electronic data processing equipment, including computers. There is also a need to protect electronic data processing equipment, including computers, from unauthorised access via electronic eaves-dropping.

In a number of important applications it is also necessary to provide plastics articles with particular magnetic properties, for example in timing-motor rotors, magnetic indicators, and beam focusing devices for television receivers. Existing articles of this type generally comprise bodies of magnetic material encased in the plastics material. It is desirable to provide plastics materials themselves with the desired magnetic properties.

In order to increase the electrical conductivity of plastics materials and/or provide the material with significant magnetic properties it is known to apply to the material or an article formed therefrom a metal coating. Such a coating may be applied by a number of methods such as by the use of a conductive paint, flame or arc spraying, electrodeless plating and vacuum metallising or cathode sputtering. All these processes require treatment of the plastics article after it has been formed into shape, generally by moulding, and so are expensive in both labour and equipment. There are also dangers in surface treatments which involve high temperatures and chemical treatment, or the use of solvents, as these may attack the plastics material. Some of these methods are also limited by geometrical considerations, for example a metallic paint may not penetrate recessed areas of the surface. Such finishes are also liable to degrade by flaking, chipping, peeling and corrosion.

Another approach is to provide a core of electrically conducting or magnetic material within the plastics body, for example by forming a sandwich of a metal foil between two plastics layers. Such a sandwich is expensive as it cannot easily be produced in a single operation.

It is also possible to render plastics materials magnetic or electrically more conductive by incorporating into the material fillers which are themselves magnetic or conductive electrically. However known fillers have serious disadvantages. For example, non-porous spherical glass particles coated with a metal may be added to the material, but a very high content of these particles is required, seriously affecting the mechanical properties of the plastics material and giving rise to severe processing difficulties. Similar problems arise if large amounts of carbon black are added. Conducting or magnetic fillers with a high aspect ratio, such as metal fibres, metal-coated glass fibres, metal flakes and metal-coated flakes may be added but are likely to give a poor surface finish, thereby rendering the plastics material unsuitable for many applications. Fibres and flakes also degrade and lose their alignment when the material is shaped by injection moulding, so that the eventual magnetic properties or electrical conductivity of the plastics material is no longer adequate.

Similar considerations apply to known ceramic materials.

Ceramic/metal composites are known in which the metal content is relatively high, but these composites—known as cermets—have so far been produced only for their high temperature strength and toughness properties and not for any magnetic effect.

Examples of known cermets include oxide-based cermets, e.g. aluminium oxide ceramic particles in a chromium or chromium alloy matrix, and carbide-based cermets, e.g. tungsten carbide particles in a cobalt matrix binder.

Cermets have been used as sensors, e.g. for oxygen, and to improve the joining of metal to ceramic parts.

One well established field in which metals have been incorporated into host materials as discrete particles rather than as an alloying component is that of catalysts. The use of metals to promote catalytic activity is very well known as is their dispersion onto a solid inorganic support (i.e. heterogeneous catalysis). (See for example "Structure and Reactivity of Modified Zeolites", Eds, P A Jacobs, N I Jaeger, P Jiru, V B Kazansky and G Schulz-Ekloff, Elseveier, Amsterdam, 1984, ISBN—0444-42351-6 and "Metal Microstructures in Zeolites", Eds, P A Jacobs, N I Jaeger, P Jiru and G Schultz—Ekloff, Elsevier, Amsterdam, 1982, ISBN—0444-42112-2). The amounts of metals used in such known materials is not such as to have any significant influence on the usable magnetic or electrical properties of these materials.

Examples of such known catalytic materials are described in, for example, "Zeolite Chemistry and Catalysis", J A Rabo, Ed. ACS, Monograph 171, Am. Chem. Soc. 1976, ISBN—0-8412-02761." The typical metals used are nickel, cobalt, iron, palladium, platinum and silver.

In such known materials the amount of metal incorporated into the inorganic material is generally less than 1% by weight since not only is the metal expensive, but also it is known that higher metal contents can be detrimental to the catalytic action of these materials.

In these known catalytic materials the metal particles are disposed within the host material in the form of small, highly dispersed, metal particles.

These known catalytic materials can be made by sorption/ion exchange on to a solid support followed by reduction with hydrogen, or decomposition of a sorbed metal complex (e.g. a carbonyl), or by direct decomposition of metal salts (e.g. cobalt oxalate).

Such well known preparative methods can result in the production of dispersions of metals, metal oxides or metal alloys within and on the host materials. Magnetic measurements often have been used to try to characterise these dispersions, but with the sole view of using magnetic measurement to define optimal catalytic properties and never to create useful magnetic properties per se. An example of this can be seen in the paper by Dadeshev et al in Dokl Akad Nauk Az SSR 1787 A3 (1) 47-50. There is disclosed the effect of content and degree of reduction of Pd on the magnetic properties and the catalytic activity of Pd-zeolite with respect of $C_5$-$C_7$ n-paraffin hydrocarbon isomerisation. The use of magnetic susceptibility showed that Pd reduction time increased with increasing Pd content (0.3–0.7 wt % Pd) and that the high magnetic susceptibility of the catalysts was due to the high dispersion of Pd.

In a piece of research work on thermal conductivity described in Chemical Abstracts, Vol. 105, No. 14, page 447, Ref. No. 121822Q the formation via an aqueous solution of porous, granulated aluminium oxide filled by nickel particles is described, but there is no apparent recognition by the research workers of the filled particles' magnetic or electrical properties.

The present invention seeks to provide inorganic materials which have enhanced magnetic and optionally electrical properties and which may be used on their own or as fillers in plastics or ceramic materials in order to alter the magnetic and optionally electrical properties thereof. The invention also relates to methods of making such materials.

According to one aspect of the invention, there is provided an inorganic material having a microporous structure (as hereinafter defined) characterised in that at least some of the micropores thereof are at least partially filled by at least one metal, metal alloy or metal compound, or mixture thereof, forming a structure within the micropores and which are present in an amount sufficient substantially to modify the magnetic and optionally the electrically conductive properties of the unfilled material, wherein the material is other than aluminium oxide filled by nickel and/or nickel nitrate.

Preferably the structure formed within the micropores is a dimensional structure (as hereinafter described) which is influenced by the structure of the microporous material.

By the term "a microporous inorganic material" as used herein is meant a porous inorganic solid wherein at least some of its pores are micropores comprising holes, cages or channels which are essentially of molecular dimensions and which are formed by the structure of the solid. By "molecular dimensions" is meant of a size large enough to accommodate molecules or groups of molecules up to but not exceeding about 50 micrometers wide. These micropores generally arise from the morphologic of the material but can in certain cases be created artificially, for example by chemical etching.

Several types of microporous inorganic material can be used in the present invention. The microporous material may have mesopores or macropores giving access to the micropores. The metal, metal alloy or metal compound comprises a guest species which is incorporated within the material and can also optionally be present on or incorporated into its surface. The microporous solid thus acts as a host and can also act as a template, whilst the guest species if added in sufficient quantity will have a one, two or three-dimensional structure which derives from the structure of the host.

Three dimensional guest species will be created by using framework structures such as those of certain natural or synthetic zeolites (e.g. chabazite, the synthetic near Faujasites (N, Y) or zeolite A) or other compounds of similar structure with other species in interstitial positions (e.g. B, Ge, Ga, P, Sn, Zn) to create zeotype material such as ALPO, (synthetic aluminophosphates) or SAPO's (silica aluminophosphates) or analogous substances containing e.g. Fe, Co, Mg (Me Al PO's), Co (Me Al PO's), etc, and heteropolyanionic compounds. "Zeotype materials" are described in "An Introduction to Molecular Sieves" by A. Dyer, J. Wiley & Sons 1988 ISBN—0-471-9181-0. Structural modifications using molten salts or a strong salt solution are described in, for example, A. Dyer et al—Recent Developments in Ion Exchange, Editors; P. A. Williams and M. J. Hudson 1987 pp 257-263 (Elsevier Applied Science) ISBN—1-85166-101-8 and R. Szoslek—Molecular Sieves. Principles of Synthesis and Identification—Van Nostrand/Reinhold 1989 ISBN—0-442-28023-8. Other possible materials include the felspathoids, e.g. sodalite, or a form of silica such as silicalite or melanophlogite.

Two dimension guests will be created by structures of layer type. These might be silicates or aluminosilicates such as clays, hydrotalcite or layer zeolites (e.g. mordenite, ferrierite) or phosphates (e.g. of zirconium, vanadium, etc.), or non-ionic compounds (e.g. chalcogenides) and can include expanded derivatives of these layered materials created by intercalation or pillaring.

Uni-dimensional guest formations can arise from the use of host structures consisting essentially of unidirectional channels of molecular dimensions such as those found in zeolite L or in the form of silica known as imogolite. Such channels can vary considerably in width, as long as they act as a template for the guest species.

The term "dimensional structure" is used herein to refer to the structure of the guest species as regulated in its various dimensions by the structure of the host species. The microporous structure may be crystalline or amorphous such that the microporosity is accessible via meso and/or macropores (e.g. alumina, silica gel or porous glass).

The guest species can be incorporated into the host via processes such as ion exchange, salt imbibition, molten salt treatment or vacuum metallising vapour phase or solvent absorption (e.g. metal carbonyls, organometallics metal chelates) by methods known per se. (See for example "New Developments in Zeolite Science and Technology", Eds. Y Murakami, A Ijima, and J W Ward, Elsevier, 1986, ISBN—0-444-98981-1).

In the ion exchange process ions initially present in the microporous substrate are replaced by the desired metal ion present in a contacting solution (aqueous or non-aqueous).

Salt imbibition is carried out by placing the microporous substrate in the environment of the appropriate salt solution (usually of high concentration i.e. approaching saturation). Here the salt molecules rather than cations are imbibed into the microporous solid. In the molten salt process the microporous solid is immersed in a molten salt. After a convenient time it is cooled and excess salt removed by washing with a suitable solvent (e.g. water).

Vacuum metallizing vapour phase or solvent absorbtion processes are carried out by sorption of the desired metal, or metal complex (e.g. carbonyl) from an appropriate vapour or solvent.

Yet another alternative is to employ electrochemically controlled deposition (see for example PCM Van Stiphout, C R Bayense, and J W Geus, Appl. Catalysis 37(1988)189). In this process copper is deposited in a controlled manner from an electrolyte solution (e.g. containing Cl or $NO_3$) on to a microporous medium (e.g. $SiO_2$). The deposition or precipitation is controlled electrochemically.

These preparative methods are broadly similar to those used to produce metal containing inorganic catalysts except that they aim to maximise micropore filling. This is in sharp contrast to that of catalyst production where the aim is to have low total metal or metal oxide contents (i.e. less than 1% by weight) and to maximise metal surface area and therefore metal utilisation, which leads to efficient catalyst operation. This does not make use of, or need, the dimensionality of the solid support. Indeed the function of the solid is solely to provide a large surface area to maximise contact between the gaseous species, whose reaction the catalyst is designed to promote, and the surface, of the metal.

Alternatively for metal particles, it has been found that guest species can be taken into hosts from colloidal solutions either in the metallic form or the form of a metal compound which may be converted into the metal or metals in situ by reduction with gaseous hydrogen or carbon monoxide.

One particularly effective method for incorporating metals into the micropores of inorganic material comprises the steps of:

(a) mixing together particles of the material with particles of a thermally-decomposable salt preferably having a low melting point, e.g. a nitrate, chloride, fluoride, thiosulphate, sulphate, chlorate or perchlorate, of the at least one metal or metal alloy in the absence of any liquid, (b) heating the mixture to a temperature and for a time sufficient to dehydrate the particles if necessary and to cause occlusion of the salt to occur into the material, (c) optionally heating the salt-occluded material to a temperature and for a time sufficient to cause at least some of the salt to decompose if the metal or metal oxide rather than its salt is desired to be the guest species, and (d) optionally reducing the guest species after steps (b) or (c), for example with hydrogen, if any undesired oxidised species is found to have been formed during step (b) or step (c).

Another efficient method of making an inorganic microporous material of the present invention comprises immersing particles of the material in a sol of said metal, metal alloy or metal compound. In this method, it has been found that the pH of the sol is important not only for maintenance of the sol but also the uptake of the sol by the porous material.

The sol may be made by treating a solution of a metal compound with a reducing agent to produce suspended colloidal particles of the metal in the solution. The solvent may generally be water or a non-aqueous solvent such as acetonitrile. Suitable sols of a wide variety of metals such as silver, copper, gold, nickel and the platinum group metals may readily be obtained by this method. Sol particle sizes generally range between 10 and 2000 Å, and the metal concentration therein can be from $10^{-4}$ to 0.01M.

By controlling the particle size and concentration of the sol, the nature and extent of absorption and adsorption of the metal on to the surface of and within the microporous solid may be controlled to give a reproducible product having the desired magnetic and optionally electrically conductive properties.

In addition to methods for producing filled inorganic material in particulate form, the present invention also provides methods for producing the said material in bulk or block form, including shaped form.

In one method the particles formed as described above can be sintered to form a bulk ceramic powder (i.e. thermally collapsed) or even a bulk ceramic body. This method preserves the incorporated metal, metal alloy or metal compound in its structured arrangement and hence retains for the bulk material at least some of its magnetic properties. Any standard processing techniques can be used but slip casting is the most preferred.

It is also known that a kaolin can be converted to a zeolite by calcination at the appropriate temperature, (e.g. about 750° C.). Thus a bulk, shaped, zeolite can be made by casting or pressing a kaolin powder into a green shape and firing to "zeolitise" it. Any of the techniques mentioned above can then be used to introduce a metal, metal alloy, metal compound or mixture thereof thereinto in accordance with the present invention.

Again in some instances metal oxides and mixed metal oxides and related materials may be formed by subsequent treatments following incorporation e.g. (a) by using specific ions to collapse the guest's structure to create useful guest species, (b) by forming surface barriers by for example calcination, or (c) by creating special conductive layers. For example, for (a), ion exchange of Ba into synthetic zeolite A creates a structure which collapses even under minor heat or pressure treatment. (A. Dyer, R. B. Gattins, A. Molyneaux, J. Inorg, Nuclear Chemistry 30, 1968, 2823–39.) For an example of (b), see the effect of hydrothermal calcination of zeolite A as described by J. Karger et al Zeolites 2, 1982, 275–8. Either method can be used to create surface layers of different magnetic/conductive properties to those of the bulk solid.

The metal or metal alloy incorporated in the microporous material may be selected from a wide variety of metals, since it has been found unexpectedly that in order to produce a microporous inorganic material having useful magnetic properties it is not necessary for the metal guest species to be inherently magnetic itself. Prior to incorporation into the micropores of the inorganic material the guest species can possess no or relatively little magnetic susceptibility in its bulk form at room temperature. It is believed that the metal particles on entering the micropores of the host species are templated into a dimensional structure by means of the internal structure of the host material and then take on magnetic characteristics when the metal content exceeds a certain threshold amount which will vary in accordance with the particular host and guest species used. Examples of suitable metals include the transition metals, lanthanides and zinc, cadmium, mercury, gallium, gold, copper and silver. For the purposes of the present invention boron is considered to be a metal. An example of a boron containing alloy is an Nd/Fe/B alloy. Such an alloy can be formed by adding neodymium and boron to a ferrisilicate.

It is also believed that when atoms or small groups of atoms of a metal are present in the internal pore system of the material and additionally metal atoms are present externally in the material on its surface, then, when the metal content of the material exceeds a given level, the internal and external metal atoms or groups of atoms interact to produce a particle of enhanced magnetic and optionally electrically conductive properties.

This onset of magnetic properties can be detected by measuring magnetic susceptibility using any convenient device. Unless indicated to the contrary, the magnetic measurements reported herein were measured using a SQUID. Alternative measuring instruments are a vibrating sample magnetometer or a Farady/Guoy balance.

By way of example, with a gold sol it is found that a mean particle size from 5 to 65 Å, preferably 5 to 10 Å, for the metal particles and a metal concentration in the sol concentration from $10^{-3}$M to $10^{-4}$M is highly suitable for treating a zeolite to produce a material possessing usable magnetic properties.

The microporous materials used in the invention may be loaded with a metal oxide or a metal chalcogenide, rather than with an elementary metal or alloy to achieve the desired magnetic and optionally electrically conducting properties. Loading with a metal oxide may be achieved by first loading the microporous material with a metal or an alloy, as described above, and then oxidising the loaded metal in situ, for example with hydrogen peroxide. The microporous material can be formed into a variety of structures having interesting magnetic properties, such as ferrites and spinels, in this way.

Catalysts containing dispersed metals such as platinum are well known, but the metal content of these products is generally less than 1% by weight, as the use of a higher metal content can be detrimental to the catalytic action of the material. (See "Zeolite Chemistry and Catalysis", J A Rabo, Ed. ACS, Monograph 171, Am. Chem. Soc. 1976, ISBN—0-8412-0276-1.) The microporous materials of the present invention, on the other hand, have much higher metal contents, generally from 1% to 65% by weight, commonly 5–65% by weight in order to give filled plastics and ceramic material the required magnetic and optionally electrical conductive properties.

Depending on the particular metal used and its amount enhanced electrical conductivity may also result. The metals in the pores and on the surface may be the same or different. This can be achieved by appropriate use of surface layer barrier formation.

The loaded microporous inorganic materials of the present invention are useful as fillers for plastics and ceramic materials as described later, and also as fillers for magnetic fluids, the latter being useful in mechanical transmission systems.

Even when the micropores of the host material are collapsed the magnetic properties of the material still remain useful.

However, these materials become especially useful when they are used as fillers.

According to another aspect of the invention, there is provided a plastics or ceramic material which contains particles of an inorganic material of the present invention as described above in an amount sufficient to modify the magnetic and optionally electrically conductive properties of the matrix material.

The plastics material may be any organic polymeric plastics material, such as a polyvinyl chloride, polyolefin, polycarbonate, polyester, polyamide, etc. Such plastics can be in the form of solid articles, such as mouldings or extrusions, or curable resins, such as adhesives and paints. These materials are normally completely non-magnetic and are excellent electrical insulators. The modification of their magnetic and optionally electrically conductive properties caused by the material of the present invention may take the form of a change in the magnetic susceptibility or permeability of the plastics material, possibly coupled with an increase in electrical or electronic conductivity.

When used as fillers, the loaded microporous material should be in the form of particles of a size suitable for incorporation into a plastics or ceramics material. A suitable particle size is generally of the order of 0.1 to 1000 microns, typically 0.5 to 15 microns. For solid plastics bodies 2 microns is generally suitable, but a smaller grain size is preferred for paints. Filler particles of this size may be blended into the matrix materials to give a homogeneous mixture which may readily be fabricated to shape by conventional methods, including high pressure extrusion, to give an article having satisfactory bulk and surface properties.

In addition to modifying the magnetic properties of the matrix material, if a sufficient amount of the filler is incorporated in the matrix material, the filler particles can produce a large number of electrically or electronically conducting networks within the matrix material according to the content and nature of filler used. Thus, the matrix material can be rendered electrically or electronically conducting by use of an inorganic filler which is not subject to the disadvantages observed with known conducting fillers, and may be employed in, for example, plastics compositions in the same manner as conventional inorganic fillers such as calcium carbonate.

The amount of microporous filler added to the matrix material will vary according to the magnetic and optionally electrically conductive properties required and can range from 2 to 90% by weight of the total weight of the filled material.

The amount of filler needed will also, of course, depend upon the nature and amount of the guest species with which the filler particles are loaded.

For example, in order to give the matrix material a given level of magnetic properties, less metal is needed when the metal inherently has useful magnetic properties, such as a cobalt-containing alloy or a iron/lanthanide alloy, than when the metal is not inherently magnetic and only by being templated into a dimensional structure using the microporous inorganic material acquires useful magnetic properties, such as silver. The resulting magnetic matrix materials find a very wide range of applications, such as in magnetic latches for refrigerator doors, clamps, bearing sleeves and energy conversion devices, magnetic rotors, magnetic memory devices such as tapes and discs, magnetic indicators and beam-focussing devices for television receivers. The microporous ferrisilicates are especially advantageous filler materials for these applications as the ferrisilicate lattice itself has magnetic properties after treatment in a reducing atmosphere, and loading with a magnetic alloy can improve its magnetic properties even further.

The incorporation of the loaded microporous inorganic materials of the present invention into a matrix material can be carried out in any conventional manner as for known fillers. Generally simple blending will be adequate, especially for plastics materials, where shaping to form a finished product can occur after loading. Loading of a ceramic material can take place after forming into the final shape where the ceramic is a microporous material itself. For example a zeolite or clay can be preformed into a useful shape (See for example D. W. Breck "Zeolite Molecular Sieves", Wiley-Interscience, 1974, ISBN—0-471-09985-6 Pg. 318). These preformed shapes may then be invested with special magnetic, electrical or electronic properties by the methods described herein in relation to the present invention.

A filler loaded with a suitable metal, alloy or metal compound may give magnetic properties (susceptibility and permeability) which differ by at least one order of magnitude from those otherwise obtained. For example, static magnetic susceptibility measurements show that particles of iron, cobalt and nickel and/or their oxides in X, Y and A zeolites give highly ferromagnetic materials. Small ferromagnetic particles (typically of 100 Å diameter or below) within the microporous solid can also give rise to superparamagnetism. Antiferromagnetic ordering of superparamagnetic moments, as shown by static magnetic measurements, can also arise under controlled reaction conditions.

A proportion of filler of at least 5% by weight is generally adequate to give an electrical conductivity high enough to provide effective electromagnetic shielding over a frequency range from 10 KHz to 10 GHz. A surface resistivity of less than 100 ohms per square is typically required. If a lower conductivity, for example to give dissipation of static charge, suffices the proportion of loaded micro- porous filler may be less. The surface resistivity in this instance is generally from 100 to $10^6$ ohms/square. A lower proportion of filler produces a smaller density of electrically conducting paths in the matrix material and consequently a lower electrical conductivity. The bulk resistivity of the filler itself may be from $10^{-6}$ to $10^{12}$ ohm/cm, most usually 1 to $10^6$ ohm/cm.

Plastics and ceramic material containing relatively low amounts of the inorganic material of the present invention may also be used in heat sensitive devices in which a change of temperature produces a change in magnetic or electrically conductive properties. They may have applications as semi-conductors and dielectrics, for example in switching systems in which memory effects are exploited. The filled plastics or ceramics of the invention may also be used in gas detection sensors, in which gases such as oxygen and ethylene are adsorbed by the microporous filler and produce a change of electrical resistance of the matrix material which can be detected.

The filler particles may also be formed of a composite structure with its surface properties differing from those of the inside the particle. For example, a particle could be magnetic inside and electrically conductive outside. There may be an interaction between the particle's internal and external properties which may be synergistic. For example an electrically conductive surface layer on the outside of a particle may interact synergistically with a magnetic dimensional structure inside the particle. This effect can be achieved by surface modification of a loaded zeolite with, e.g. a silver-rich layer. This could be achieved electrolytically or by vacuum metallising.

The synergistic interaction between internally held material and surface layers could be achieved by partially collapsing the zeolite surface layers. This can be done by introducing iron or zinc into the surface layers, e.g. by ion exchange, after loading with metal and then collapsing the surface layers by heating.

Fillers, methods of making them and their uses according to embodiments of the invention will now be described by way of illustration by the following Examples.

EXAMPLE 1

3 sols were prepared as follows:

1. 5 ml of a 1% solution of sodium citrate in water was added to a refluxing 0.01% aqueous solution of chloroauric acid (containing 49.42% gold by weight) with stirring. All water used was double-distilled. The mixture was boiled for 1 hour to produce a gold sol.

2. 0.120 g of polyethylene imine (molecular weight 1800, from Polysciences Inc.) was dissolved in 100 ml of acetonitrile which had been freshly distilled over calcium hydride. 20 ml of the resulting solution was added to a further 70 ml of acetonitrile, and 10 ml of a 0.01M solution of silver nitrate in acetonitrile was then added and the mixture stirred. A sol containing $10^{-3}$M of colloidal silver was obtained. In this nitrogen for 2 hours. The methanol had previously been method the imine polymer reduced the silver nitrate and also protected the colloidal dispersion obtained.

3. 500 ml of a $1.37 \times 10^{-3}$M solution of cupric acetate monohydrate in methanol was refluxed under refluxed under nitrogen for 24 hours. A small excess of a $4.1 \times 10^{-2}$M solution of hydrazine hydrate in methanol was then added with stirring and a sol of copper in methanol obtained. This dispersion was subsequently handled under an argon atmosphere.

Samples of the gold, silver and copper sols prepared as above were placed in 1 cm stoppered quartz cells and characterised by spectroscopy using a Pye Unicam SP 8800 machine.

Samples of the gold, silver and copper dispersions were characterised by low-resolution Transmission Electron Microscopy by placing a drop of each sol on a 3 mm metal grid coated with a thin amorphous carbon film, allowing the sample to dry for 1 minute, removing excess liquid with absorbent paper, and observing the sample using a JEOL 200—CX transmission electron microscope. Particle size analysis was carried out by measurements of micrographs recorded at 100,000×.

The above-described colloidal dispersions 1, 2 and 3 were then used for loading specimens of Zeolites A, X and Y. Zeolites A, X and Y consist of 3 dimensional arrays of interconnected cages such that large cages accessed via a 7-8 Å oxygen window are created. Access to the small sodalite cages is via 2-3 Å windows. Zeolite A has a similar structure with the large cages accessed via 4-5 Å windows. The zeolites in their sodium cation form was first calcined at 300° C. under vacuum.

The respective zeolites were immersed in the colloidal suspensions. The sols were observed to lose colour and the zeolites became coloured as the colloidal metal particles were adsorbed.

EXAMPLE 2

A sample of γ-alumina was calcined in air at 100° C. and slurried with the respective colloidal dispersions 1, 2 and 3 mentioned above. The sols again were observed to lose colour, and it was found that the alumina acquired a slight colouration on immersion.

The fillers obtained in Examples 1 and 2 were characterised by transmission and scanning electron microscopy.

The results obtained may be summarized as follows. The initial copper-containing sol 3 was of a red colour and had a particle size for the copper of 150-20 Å with no significant particle aggregation. The gold sol 1 was deep red in colour and contained mono dispersed, well separated gold particles of average particle size about 50 Å. The silver sol 2 was yellow and had a silver particle size of about 100 Å with no aggregation.

As measured after immersion in the respective sols the zeolite X and Y were found to have a particle size of from 1 to 2 microns, zeolite A a particle size of about 5 microns and the alumina a particle size of from 1 to 5 microns. The loaded fillers obtained were all found to have higher electrical conductivity and enhanced magnetic properties than the unloaded fillers.

EXAMPLE 3

A Y zeolite loaded with silver was made by washing the zeolite with 0.1M solution of sodium acetate in water and putting it in contact with a 1M aqueous solution of silver nitrate for 24 hours in the dark. The zeolite was then filtered and washed, dried under vacuum and then reduced in a hydrogen atmosphere at a pressure of 300 Torr at room temperature.

The silver-loaded zeolite was found to be electrically conducting and highly suitable for use as a filler. This was demonstrated by electrodeless measurements using powdered samples of the reduced silver-Y zeolite. These samples produced a drop of some 50% of the transmitted power in a variable frequency Vector network analyzer (Hewlett Packard 8"153 model, operating over the range 300 kHz to 3 GHz). Furthermore, these samples produced a marked detoning of a microwave (9 GHz) cavity made by X-arian Associates, thereby demonstrating high local conductivities in the powder samples.

EXAMPLE 4

Twelve samples of fillers were prepared by ion exchange as follows:

Zeolites Na-X, Na-Y, K-L and Mordenite (Laporte Inorganics) were each cation exchanged with Ag, Co, Pt according to standard procedures described in the literature. In all cases a very low solid:liquid ratio of 0.4 g l was employed to avoid surface-hydrolysis of the zeolite with the aqueous ion exchange solution of respectively $AgNO_3$, $Co(NO_3)_2.6 H_2O$ and $Pt(NH_3)_4Cl_2$ at 0.005M concentration. Exchange as effected by stirring the required amount of zeolite in the ion exchange medium for 24 hrs. after which time the resultant solid was filtered through a No. 4 glass sinter washed with $2 \times 100$ ml aliquots of de-ionized water and allowed to dry under vacuum. Samples prepared in this way after drying were in the form of free flowing powders. The appearances of the twelve samples after ion exchange are given in Table I.

EXAMPLE 5

Two samples of fillers were prepared by salt occlusion as follows:

Two mixtures were prepared, each by intimately grinding 2 g of either $AgNO_3$ or $CO(NO_3)_2.6 H_2O$ with 2 g of zeolite Na-X. Each mixture was then dehydrated at room temperature for 2 hrs. and then the temperature raised to 550° C. at a rate of 1° C./min and held to 72 hrs. After this time the furnace was allowed to cool to room temperature under vacuo at the natural furnace cooling rate. The appearances of the two samples after salt occlusion are given in Table II.

EXAMPLE 6

The effect of dehydration followed by reduction on some fillers of the invention was examined as follows:

About 2 g of the samples of the filled zeolite which were prepared as described in Examples 4 and 3 above were degassed under a vacuum of about $1 \times 10^{-2}$ torr for 2 hrs. at room temperature. The temperature of the furnace was then raised to 250° C. at a heating rate of 1° C./min. and held there for 12 hrs. After this time the furnace was allowed to cool at its natural cooling rate to room temperature under vacuum.

For most of the samples a dehydration temperature of 250° C. was employed whilst the remaining samples were all dehydrated at 650° C.

After dehydration at the specified temperature, a mixture of 30% by volume $H_2$ in Ar was introduced into the furnace and the temperature raised to either 400° C. or 650° C. at a rate of 5° C./min. This temperature was held for 4 hrs. after which time the $H_2/Ar$ flow was replaced by a $N_2$ flow and the furnace allowed to cool naturally to room temperature. The appearance of the samples after dehydration and reduction are given in Tables III and IV.

Table III shows the results obtained using filled zeolites, including Mordenites ("M"), prepared as in Example 4 above whilst Table IV shows the results obtained using filled zeolites prepared as in Example 5 above. Of the pairs of numbers qualifying the samples, the first is the dehydration temperature that was used, whilst the second is the temperature at which reduction took place.

The gram susceptibility of a number of fillers of the invention prepared by the methods described in the foregoing Examples were determined and the results are set out in Table V. Where no second temperature is mentioned the sample was not reduced. A large field dependence can be seen for the occluded samples.

Indeed, for the occluded, reduced cobalt filled zeolite X samples, their ferromagnetic properties were so strong that the particles behaved like iron fillings in response to the movement of a magnet nearby.

EXAMPLE 7

The effects of variation of applied magnetic field and of sample reduction temperature on the magnetic properties of the fillers of the invention were examined as follows:

Three samples of zeolite Na-X containing about 21% by weight of cobalt and formed by salt occlusion as described in Example 5 but employing differing dehydration and reduction temperatures were tested using differing applied field strengths. The results are given in Table VI.

It can be seen that all of the samples demonstrated a high field dependence and that the dehydration and reduction temperatures have an important effect on the sample's magnetic properties, particularly the dehydration temperature.

EXAMPLE 8

The effect of variation of temperature on the magnetic properties of the fillers of the invention was examined as follows:

A sample of a cobalt-containing zeolite Na-X formed by salt occlusion as described in Example 5 using a dehydration temperature of 200° C. and a reduction temperature of 450° C. was ground to form a powder sample which was then tested for its magnetisation hysteresis loop characteristics for an applied magnetic field of from $-8$ to $-8$ kilo Oersteds. Measurements were made using a vibrating sample magnetometer in a range of temperatures from 4.2K to 900K and the results are given in Table VII.

These results show rather anomalous behaviour of the sample. Saturation magnetisation starts to dip at about 500K and would normally be expected to continue to fall to cut the zero axis at the Curie temperature. (In this case a value of about 700K would be expected from the shape of the curve.) However, the curve levels out at about 16 emu/g indicating either the presence of a second magnetic material or the presence of "massive" cobalt (i.e. in particles of 1000 Å or more).

The lower temperature behaviour is characteristic of that expected for hexagonal close packed cobalt aggregates which are less than 500 Å in diameter and are substantially spherical. This is a surprising finding since such small cobalt aggregates are normally, face centred cubic in structure. The reason for postulating an HCP structure is that FCC Cobalt would give lower coercivity values at low temperatures. Coercivity also shows a blip in the curve at high temperature, although this is less marked than that for saturation magnetisation.

The initial susceptibility and Inverse initial susceptibility measurements also indicate abnormal behaviour. Normally the inverse value continues to fall, cutting the zero axis at the Curie temperature. In this case it rises again; further evidence for the two phase system. (The inverse susceptibility is normally plotted to determine the type of magnetic behaviour being shown by the sample.) In this case behaviour is odd, but definitely shows that the sample is ferromagnetic.

EXAMPLE 9

Several samples of polyester filled with zeolites of the present invention were prepared. Those containing highly ferromagnetic cobalt occluded zeolites were found to have retained their ability to be attracted to a magnet despite being incorporated into the polyester. The resin used in each case was Stypol 40/5746 supplied by Freeman Chemicals Limited of the Wirral, Cheshire. This is a commercially available resin.

For plastics materials especially, materials of the present invention have advantages over alternative fillers which have been used to modify the magnetic or electrically conductive properties of plastics material, including the following:

A. They are robust and can be listed in conventional plastics moulding processes, including injection moulding, in the same manner as conventional plastics fillers without detriment to the magnetic, electrical or electronic performance of the plastics material.

B. The microporous fillers have very high internal surfaces, resulting in large uptakes of magnetic material and possibly also very extensive conductive networks within the plastics material leading to a high conductivity for a given content of filler.

C. The mechanical properties of the filled plastics material are not gravely affected by thermal expansion or contraction during fabrication of the plastics article, as happens with bulk metal fillers.

D. Loaded microporous solids are cheap to manufacture at a suitable particle size. In order to increase the electrical conductivity of plastics to a given extent, microporous fillers loaded with gold are cheaper than copper flakes.

E. The templated structures formed by the metal, metal alloy or metal compound within the host material have a dimensionality (one, two or three dimensions) and an extent which may be varied very widely by a suitable choice of microporous material and loading levels.

F. The metals, metal allows or metal compounds loaded within the micropores of the filler, and those loaded on the outside surface, may be controlled independently in order to achieve particular combinations of electrical, electronic and magnetic properties. For example, the loading within the micropores may give rise to favourable magnetic properties while the loading on the surfaces of the filler particles can produce favourable electrically conductive properties.

TABLE I

| Sample | Appearance after ion Exchange |
| --- | --- |
| AgX | white |
| AgY | white |
| AgL | white |
| AgM | white/cream |
| Co-X | purple/pink |
| Co-Y | pink |
| Co-L | v. pale pink |
| Co-M | pale pink |
| Pt-X | white |
| Pt-Y | white |
| Pt-L | white |
| Pt-M | white |

TABLE II

| Sample | Appearance after Salt Occlusion |
| --- | --- |
| Ag-X occluded | yellow brown |
| Co-X occluded | black |

TABLE III

| Sample | Appearance after Reduction |
| --- | --- |
| AgX 250/400 | black |
| AgX 250/650 | brown black |
| AgX 650/650 | brown |
| AgY 250/400 | mid yellow brown |
| AgL 250/400 | red/brown |
| Ag-M 250/400 | cream |
| CoX 250/650 | blue/grey |
| CoX 250/650 | grey/blue |
| CoX 650/650 | grey |
| CoY 250/400 | grey/brown |
| Co-L 250/400 | pale grey |
| Co-M 250/400 | pale brown |
| Pt-X 250/400 | grey |
| Pt-X 250/650 | dark grey |
| Pt-Y 250/400 | grey |
| Pt-Y 250/650 | grey |
| Pt-L 250/400 | pale grey |
| Pt-L 250/650 | pale grey |
| Pt-M 250/400 | grey |
| Pt-M 250/650 | brown/grey |

TABLE IV

| Sample | Appearance after Occlusion and Reduction |
| --- | --- |
| Ag-X occluded 250/400 | brown |
| Ag-X occluded 250/650 | brown |
| Ag-X occluded 650/650 | black (dark brown) |
| Co-X occluded 250/400 | black |

TABLE IV-continued

| Sample | Appearance after Occlusion and Reduction |
|---|---|
| Co-X occluded 250/650 | black |
| Co-X occluded 650/650 | black/grey |

TABLE V

| Sample | Gram magnetic susceptibility (c.g.s.units/gm) | Temp. (K) | Field Strength (G) |
|---|---|---|---|
| NaY zeolite | $-0.48 \times 10^{-6}$ | 293 | 5,000 |
| AgX (reduced) | $+0.9 \times 10^{-4}$ | 293 | 5,000 |
| AgY | $+6.1 \times 10^{-6}$ | 293 | 5,000 |
| AgY (reduced) | $+0.78 \times 10^{-4}$ | 293 | 5,000 |
| Ag metal | $+1 \times 10^{-8}$ | 293 | 5,000 |
| Co-L | $-0.55 \times 10^{-6}$ | 293 | 5,000 |
| Co metal | 1.5 | 293 | 5,000 |
| Co-X occl | $+5.1 \times 10^{-6}$ | 293 | 5,000 |
| Co-X occl 200/650 | $+0.31 \times 10^{-3}$ | 293 | 5,000 |
| Co-X occl 200/450 | $+0.49 \times 10^{-3}$ | 293 | 5,000 |
| Co-X occl 650/650 | $+0.81 \times 10^{-3}$ | 293 | 5,000 |
| Co-X occl 200/450 | $+0.15 \times 10^{-1}$ | 22 | 50 |
| Co-Y | $+10.0 \times 10^{-6}$ | 293 | 5,000 |
| Co-Y occl | $+11.0 \times 10^{-6}$ | 293 | 5,000 |
| Co-Y occl - Dy | $+53.0 \times 10^{-6}$ | 293 | 5,000 |
| Comparison Example | | | |
| A conventional Fe/Nd B magnet | $+9.0 \times 10^{-3}$ | 293 | 100 |

TABLE VI

| Sample | Dehydration/Reduction Temp. | Applied Field (G) | Gram Mag. Susceptibility (c.g.s. units/gm $\times 10^{-6}$) |
|---|---|---|---|
| A | 250/400 | 50 | 15,000 |
| A | 250/400 | 1,000 | 1,100 |
| A | 250/400 | 5,000 | 490 |
| A | 250/400 | 40,000 | 85 |
| B | 250/650 | 3,000 | 480 |
| B | 250/650 | 5,000 | 310 |
| B | 250/650 | 40,000 | 70 |
| C | 650/650 | 1,000 | 2,100 |
| C | 650/650 | 7,000 | 590 |
| C | 650/650 | 40,000 | 126 |

TABLE VII

| TEMP (K) | Coercivity (Oersteds) | Saturation Magnetisation $I=$(emu/g) | Initial Susceptibility $K_2$ (emu/g Oe) | Inverse Susceptibility $1/K_2$ (g Oe/emu) |
|---|---|---|---|---|
| 14.2 | 840 | 21.3 | — | — |
| 50 | 832 | 21.2 | — | — |
| 100 | 764 | 21.0 | — | — |
| 150 | 691 | 20.8 | — | — |
| 200 | 582 | 20.7 | — | — |
| 250 | 491 | 20.5 | — | — |
| 280 | 436 | 20.2 | — | — |
| 320 | 400 | 20.0 | — | — |
| 380 | 373 | 19.1 | .0126 | 79.3 |
| 420 | 336 | 18.6 | .0141 | 70.9 |
| 470 | 300 | 18.0 | .0147 | 68.0 |
| 520 | 255 | 16.1 | .0150 | 66.7 |
| 570 | 223 | 15.8 | .0152 | 65.9 |
| 620 | 209 | 17.0 | .0170 | 58.8 |
| 670 | 177 | 15.9 | .0195 | 51.3 |
| 720 | 159 | 15.9 | .0206 | 48.5 |
| 770 | — | — | .0213 | 46.9 |
| 780 | 123 | 15.9 | .0208 | 48.1 |
| 800 | — | — | .0192 | 52.3 |
| 820 | — | — | .0149 | 71.9 |
| 840 | — | — | .0051 | 195.5 |
| 860 | — | — | .0037 | 312.5 |

We claim:

1. An inorganic material with macroscopic magnetic and optionally electrically conductive properties, having a microporous structure of internal micropores containing at least one metal, metal alloy or metal compound, or mixture thereof, forming a structure within the internal micropores and which are present in an amount sufficient to substantially improve the magnetic and optionally the electrically conductive properties of the unfilled material, wherein the material is other than aluminum oxide filled by nickel or nickel nitrate.

2. An inorganic material as claimed in claim 1 wherein the structure formed within the internal micropores is a dimensional structure which is regulated by the internal structure of the microporous material.

3. An inorganic material as claimed in claim 1 including at least one metal, metal alloy or metal compound or mixture thereof additionally present on or incorporated into the outer surface of the material.

4. An inorganic material with macroscopic magnetic and optionally electrically conductive properties, having a microporous structure of internal micropores containing at least one metal, metal alloy or metal compound, or mixture thereof, forming a structure within the internal micropores and which are present in an amount sufficient to substantially improve the magnetic and optionally the electrically conductive properties of the unfilled material, wherein the said at least one metal, metal alloy or metal compound or mixture thereof are incorporated in the internal micropores and at least one different metal, metal alloy or metal compound or mixture thereof are present on or incorporated into the outer surface of the material.

5. An inorganic material as claimed in claim 1 comprising a zeolite or a zeotype material.

6. An inorganic material as claimed in claim 1 comprising a porous glass, a pillared clay, a silicate or a phosphate.

7. An inorganic material as claimed in claim 1, when in particulate form in which the particulate size of the material is from 0.1 to 1000 microns.

8. An inorganic material as claimed in claim 1, comprising from 1% to 65% by weight of said at least one metal, metal alloy, metal compound or mixture thereof.

9. An inorganic material as claimed in claim 8, comprising from 5% to 65% by weight of said at least one metal, metal alloy, metal compound or mixture thereof.

10. An inorganic material as claimed in claim 1 wherein the metal, metal alloy, metal compound or mixture thereof consists of or contains cobalt.

11. An inorganic material as claimed in claim 1 wherein the at least one metal, metal alloy, metal compound or mixture thereof possesses prior to incorporation into the micropores of the inorganic material no or relatively little magnetic susceptibility in its bulk form at room temperature, the improved macroscopic magnetic properties arising from the creation of the said structure within the internal micropores of the inorganic material.

12. An inorganic material as claimed in claim 11 wherein the at least one metal, metal alloy, metal compound or mixture thereof consists of or contains gold, silver, copper or platinum.

13. A method of making an inorganic material as claimed in claim 1, which method comprises immersing the unfilled material in a sol of impregnant comprising said at least one metal, metal alloy, metal compound, or mixture thereof to sorb at least 1% by weight of said at least one metal, metal alloy, metal compound or mixture thereof; and, when said impregnant comprises a metal compound other than a metal oxide or metal chalcogenide, converting said metal compound to a metal or metal oxide.

14. A method as claimed in claim 13, in which the particles of the sol have a size of from 10 to 2000 Å.

15. A method as claimed in claim 13, in which the concentration of metal in the sol is from $10^{-4}$M to 0.01M.

16. A method of making an inorganic material as claimed in claim 1, which method comprises the steps of:
 (a) mixing together particles of the unfilled material with particles of a thermally decomposable salt of the at least one metal or metal alloy in the absence of any liquid,
 (b) heating the mixture to a temperature and for a time sufficient to dehydrate the particles and to cause occlusion of the salt to occur into the material.

17. A method as claimed in claim 16 including the step of heating the salt occluded material to a temperature and for a time sufficient to cause at least some of the salt therein to decompose.

18. A method as claimed in claim 16 including the step of (c) reducing (i) the occluded salt formed in step (b) or (ii) a decomposition product formed by the heating of the occluded salt to a temperature and for a time sufficient to cause at least some of the salt therein to decompose.

19. A method as claimed in claim 18 wherein the reduction is effected by hydrogen.

20. A method as claimed in claim 16 wherein the salt is a nitrate.

21. An inorganic material as claimed in claim 1 wherein substantially all of the internal micropores thereof are collapsed from heating said inorganic material containing said metal, metal alloy, metal compound or mixture thereof.

22. A plastics material possessing macroscopic magnetic and optionally electrically conductive properties and containing particles of an inorganic material as claimed in claim 1 in an amount sufficient to provide the plastics material with usable macroscopic magnetic and optionally electrically conductive properties.

23. A plastics material as claimed in claim 22 containing from 2 to 90% by weight of the inorganic material.

24. A ceramic body possessing macroscopic magnetic and optionally electrically conductive properties and containing an inorganic material as claimed in claim 1 in an amount sufficient to provide the ceramic body with usable macroscopic magnetic and optionally electrically conductive properties.

25. A ceramic body as claimed in claim 24 which has been sintered to collapse substantially all of the internal micropores thereof.

26. An inorganic material as claimed in claim 1 wherein (1) all of the internal micropores are partially filled, (2) some of the micropores are substantially completely filled, or (3) all of the micropores are substantially completely filled.

27. An inorganic material as claimed in claim 4 wherein (1) all of the internal micropores are partially filled, (2) some of the micropores are substantially completely filled, or (3) all of the micropores are substantially completely filled.

28. A method as claimed in claim 15 further comprising treating the material containing said impregnant to collapse some of the internal micropores thereof.

29. A method as claimed in claim 19 further comprising collapsing substantially all of the internal micropores thereof.

30. A method as claimed in claim 16 further comprising treating the material containing said impregnant collapse some of the internal micropores thereof.

31. A method as claimed in claim 30 further comprising collapsing substantially all of the internal micropores thereof.

32. An inorganic material with macroscopic magnetic and optionally electrically conductive properties, having a microporous structure of internal micropores substantially filled with an impregnant consisting essentially of at least one metal, metal alloy or metal compound, or mixture thereof, forming a structure within the internal micropores and present in an amount of at least 1% by weight, wherein the material is other than aluminum oxide filled by nickel or nickel nitrate.

33. An inorganic material according to claim 32 wherein said impregnant is a metal, metal alloy, metal oxide, metal chalcogenide or mixture thereof which possesses prior to incorporation into the micropores of the inorganic material no or relatively little magnetic susceptibility in its bulk form at room temperature; and wherein, if any of said internal micropores remain unfilled or partially filled, at least some of said filled or partially filled micropores are collapsed.

* * * * *